(12) United States Patent
Ishihara

(10) Patent No.: US 6,563,624 B1
(45) Date of Patent: May 13, 2003

(54) OPTICAL SCANNING APPARATUS AND IMAGE-FORMING APPARATUS USING IT

(75) Inventor: Keiichiro Ishihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/697,713

(22) Filed: Oct. 27, 2000

(30) Foreign Application Priority Data

Oct. 29, 1999 (JP) ............................................. 11-308895
Oct. 25, 2000 (JP) ........................................ 2000-325606

(51) Int. Cl.[7] ............................................. G02B 26/08
(52) U.S. Cl. ....................... 359/205; 359/212; 359/216; 347/259
(58) Field of Search ................................ 359/204–207, 359/216–219; 347/243–244, 258–261; 250/234–236

(56) References Cited

U.S. PATENT DOCUMENTS

| 5,410,563 | A | | 4/1995 | Nakamura et al. ........... 372/101 |
| 6,067,106 | A | | 5/2000 | Ishibe et al. ................ 347/258 |
| 6,094,286 | A | * | 7/2000 | Kato ........................... 359/206 |
| 6,215,574 | B1 | * | 4/2001 | Toyoda ....................... 359/207 |

FOREIGN PATENT DOCUMENTS

| EP | 0 676 658 A2 | 10/1995 |
| EP | 0 827 004 A2 | 3/1998 |
| EP | 0 640 144 A1 | 5/1998 |
| EP | 0 872 754 A1 | 10/1998 |
| JP | 6-118346 | 4/1994 |
| JP | 10-333070 | 12/1998 |

* cited by examiner

*Primary Examiner*—James Phan
(74) *Attorney, Agent, or Firm*—Fitzpatrick, Cella, Harper & Scinto

(57) ABSTRACT

Provided are an optical scanning apparatus capable of controlling a focus movement amount to a small value on a surface to be scanned, even with change in the oscillation wavelength of light from a light source and/or with environmental change, and an image-forming apparatus using it. The optical scanning apparatus has a light source, a first imaging optical system for converging light emitted from the light source, a deflector for deflecting the light from the first imaging optical system, a second imaging optical system for scanning the surface to be scanned, with the light deflected by the deflector, and at least one diffraction optical element in the first imaging optical system or in the second imaging optical system. In the optical scanning apparatus, the power of the diffraction optical element is properly set to reduce focus movement on the surface to be scanned, with change in the oscillation wavelength of the light from the light source and focus movement on the surface to be scanned, with change in ambient temperature.

17 Claims, 5 Drawing Sheets

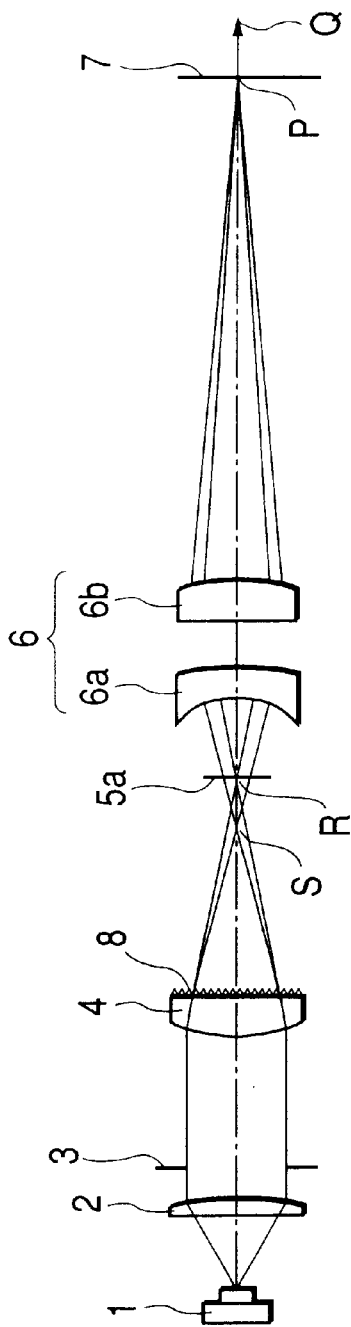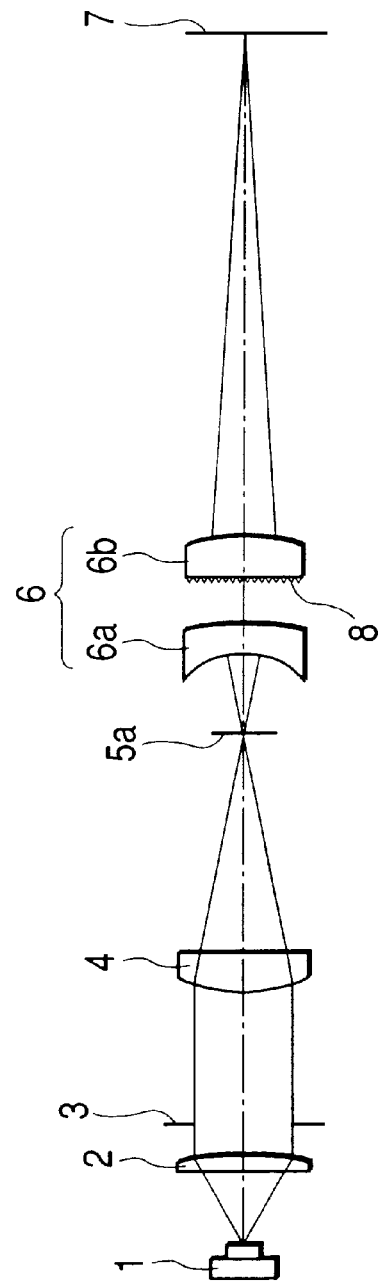

OPTICAL SCANNING APPARATUS AND IMAGE-FORMING APPARATUS USING IT

BACKGROUND OF THE INVENTION

1. Field of the Invention

The present invention relates to an optical scanning apparatus and an image-forming apparatus using it and to the optical scanning apparatus suitably applicable to the image-forming apparatus, for example, such as laser beam printers, digital copiers, etc. involving the electrophotographic process, which is constructed to converge light emitted from a light source means, by a first imaging optical system, reflectively deflect the converged light by a polygon mirror as a deflecting means, and optically scan a surface to be scanned, through a second imaging optical system to record image information thereon. More particularly, the invention relates to the optical scanning apparatus capable of controlling focus movement amounts to small values on the surface to be scanned, even with variation in ambient temperature and/or with change in the initial operating wavelength of the light from the light source means, so as to be able to keep variation little in the spot size of the beam, thereby always providing good images, and to the image-forming apparatus using it.

2. Related Background Art

FIG. 5 is a schematic diagram to show the principal part of a light scanning optical system in a conventional optical scanning apparatus.

In the conventional optical scanning apparatus illustrated in FIG. 5, the light modulated based on image information and emitted from the light source means 1 is incident to a first imaging optical system $L_1$ comprised of a collimator lens 2, a stop 3, and a cylindrical lens 4.

In this apparatus the light from the light source means 1 is converted into nearly parallel light by the collimator lens 2, the nearly parallel light is limited by the aperture stop 3, and the light is then incident to the cylindrical lens 4 having a predetermined refractive power only in the sub-scanning section.

The nearly parallel light incident to the cylindrical lens 4 emerges in the nearly parallel light state in the main scanning section as it is.

The light is converged in the sub-scanning section to be focused as an almost linear image on a deflective reflection facet 5a of a polygon mirror 5 (deflecting means). The light reflectively deflected by the polygon mirror 5 is guided through a second imaging optical system $L_2$ with the fθ characteristic onto a surface to be scanned 7 (a surface of a photosensitive drum), and the polygon mirror 5 is rotated to optically scan the surface to be scanned 7 (the surface of the photosensitive drum) to record the image information.

For example, Japanese Patent Application Laid-Open No. H06-118346 suggests a modification of the optical scanning system of the structure illustrated in FIG. 5, in which focus movement on the surface to be scanned 7 is corrected by applying a diffraction optical element to part of the optics.

In the above application the focal length of a resin condenser lens is set to a value capable of canceling out change in the focal length of a Fresnel lens due to variation in the oscillation wavelength of the laser diode and change in the focal length of the Fresnel lens due to variation in temperature.

Japanese Patent Application Laid-Open No. H10-333070 describes that the scanning optical apparatus has a first optical system for guiding the light emitted from the light source means, to the deflecting means and a second optical system for focusing the light deflected by the deflecting means, on the surface to be scanned and a diffraction optical element is provided in part of at least one optical system of the first and second optical systems whereby aberration variation in the sub-scanning direction of the scanning optical system due to environmental variation (temperature variation) is corrected by change in power of the diffraction optical element and variation in the wavelength of the light source means.

In the both cases, the focus movement caused by the optical elements other than the diffraction optical element is canceled by the power change of the diffraction optical element, making use of the property that the diffraction optical element greatly changes the power, depending upon the operating wavelength.

Incidentally, factors causing the focus movement on the surface to be scanned include, for example, dispersion or variation of the oscillation wavelength of the light from the light source means and change in ambient temperature, but mechanisms of focus variation are greatly different from each other.

The former is nothing but the focus variation affected only by the power change of the optical systems due to the variation in the operating wavelength, whereas the latter is the focus variation caused by combination of refractive index change of materials and positional deviation of the optical elements, change in the oscillation wavelength of the light from the light source means, etc. due to the change in the ambient temperature.

Since these hold independently, the aforementioned suggestions were not always satisfactory to these factors.

Specifically, the light scanning optical system in Japanese Patent Application Laid-Open No. 06-118346 failed to include consideration to the focus movement caused by the environmental change. For example, it is focus movement due to positional variation of the collimator lens and focus movement caused by change in refractive powers of the collimator lens, cylindrical lens, fθ lens, etc. due to the change in the oscillation wavelength of the light from the light source means. For that reason, the optical system was one that was not always able to make good correction for focus movement amounts with change of ambient temperature.

Since the operating wavelength largely varies depending upon the light source means under practical use, focus movement amounts caused by the change of the operating wavelength are unignorable in the light scanning optical systems using the diffraction optical element that largely changes the power of the optical system with change in the operating wavelength. However, the above application failed to take it into consideration.

Japanese Patent Application Laid-Open No. H10-333070 gave consideration to the focus movement caused by the change of ambient temperature, including the above factors of focus movement, but failed to take the variation in the operating wavelength (initial wavelength) of the light source means into consideration.

The present invention has been accomplished in order to solve the above problems and an object of the invention is thus to provide an optical scanning apparatus capable of always forming good images while controlling variation to small values in the spot size of the beam on the surface to be scanned, by reducing the focus movement amounts even on the occasion of simultaneous occurrence of the change in the oscillation wavelength of the light from the light source means due to dispersion of the oscillation wavelength of the light from the light source means and/or due to the change of the ambient temperature, and the change in refractive indexes of the materials of the optical systems due to the change of ambient temperature, and to provide an image-forming apparatus using it.

SUMMARY OF THE INVENTION

An optical scanning apparatus according to one aspect of the invention is an optical scanning apparatus comprising light source means, a first imaging optical system for converging light emitted from the light source means, deflecting means for deflecting the light from the first imaging optical system, a second imaging optical system for scanning a surface to be scanned, with the light deflected by the deflecting means, and at least one refraction optical element and one diffraction optical element in the first imaging optical system or in the second imaging optical system, wherein a power of said diffraction optical element is set to a third power between a first power and a second power, where the first power is a power that the diffraction optical element has when focus movement on the surface to be scanned, caused by the refraction optical element with a change of an oscillation wavelength of the light from the light source means, can be canceled by a power change of the diffraction optical element and the second power is a power that the diffraction optical element has when focus movement on the surface to be scanned, caused by the refraction optical elements with a change of ambient temperature, can be canceled by a power change of the diffraction optical element.

In the optical scanning apparatus according to another aspect of the invention, said diffraction optical element has the power in the sub-scanning direction.

In the optical scanning apparatus according to another aspect of the invention, said diffraction optical element is provided in said first imaging optical system.

In the optical scanning apparatus according to another aspect of the invention, said diffraction optical element is placed on a surface closest to said deflecting means in said first imaging optical system.

In the optical scanning apparatus according to another aspect of the invention, said first imaging optical system comprises a cylindrical lens and the diffraction optical element is provided on one surface of said cylindrical lens.

In the optical scanning apparatus according to another aspect of the invention, where a longitudinal magnification of said second imaging optical system in the sub-scanning direction is as (times), a focal length fcl (mm) of said cylindrical lens satisfies the following equation:

$$fcl \leq 500/\alpha s.$$

In the optical scanning apparatus according to another aspect of the invention, said cylindrical lens includes no position adjusting means for adjusting the position in the optical-axis direction.

The optical scanning apparatus according to another aspect of the invention comprises a third imaging optical system for converging the light deflected by said deflecting means and guiding the light into light detecting means, wherein said first imaging optical system comprises a cylindrical lens, said third imaging optical system comprises an imaging lens having a power at least in the main scanning direction, and said cylindrical lens and said imaging lens are integrally formed.

In the optical scanning apparatus according to another aspect of the invention, the following equation is satisfied:

$$|d\Delta S\_T| \geq |d\Delta S\_\lambda| \text{ if } |d\Delta ST\_\lambda| \geq |d\Delta S\lambda\_T|, \text{ or}$$

$$|d\Delta S\_T| \leq |d\Delta S\_\lambda| \text{ if } |d\Delta ST\_\lambda| < |d\Delta S\lambda\_T|,$$

where $d\Delta S\lambda\_T$ is a focus movement amount with an ambient temperature change when the power of said diffraction optical element is the first power; $d\Delta ST\_\lambda$ is a focus movement amount with a change of an initial operating wavelength of said light source means when the power of said diffraction optical element is the second power; $d\Delta S\_T$ is a focus movement amount with the ambient temperature change and $d\Delta S\_\lambda$ is a focus movement amount with the change of the initial operating wavelength of said light source means when the power of said diffraction optical element is the third power.

In the optical scanning apparatus according to another aspect of the invention, the elements are set so that a focus movement amount with a change of 1 nm in the operating wavelength is not more than 0.3 mm.

An image-forming apparatus according to a further aspect of the present invention is an image-forming apparatus comprising the scanning optical apparatus as set forth, a photosensitive body placed on said surface to be scanned, a developing unit for developing an electrostatic latent image formed on said photosensitive body with the light under scanning by said scanning optical apparatus, into a toner image, a transfer unit for transferring said toner image developed, onto a transfer medium, and a fixing unit for fixing the toner image transferred, on the transfer medium.

Another image-forming apparatus according to a further aspect of the invention is an image-forming apparatus comprising the scanning optical apparatus as set forth, and a printer controller for converting code data supplied from an external device, into an image signal and supplying the image signal to said scanning optical apparatus.

BRIEF DESCRIPTION OF THE DRAWINGS

FIG. 2 is an explanatory diagram to illustrate the principles of correction for focus movement in the sub-scanning direction in Embodiment 1 of the present invention;

FIG. 4 is a cross-sectional view of principal part in the sub-scanning direction in Embodiment 5 of the present invention;

DETAILED DESCRIPTION OF THE PREFERRED EMBODIMENTS

Embodiment 1

Figure 1A:
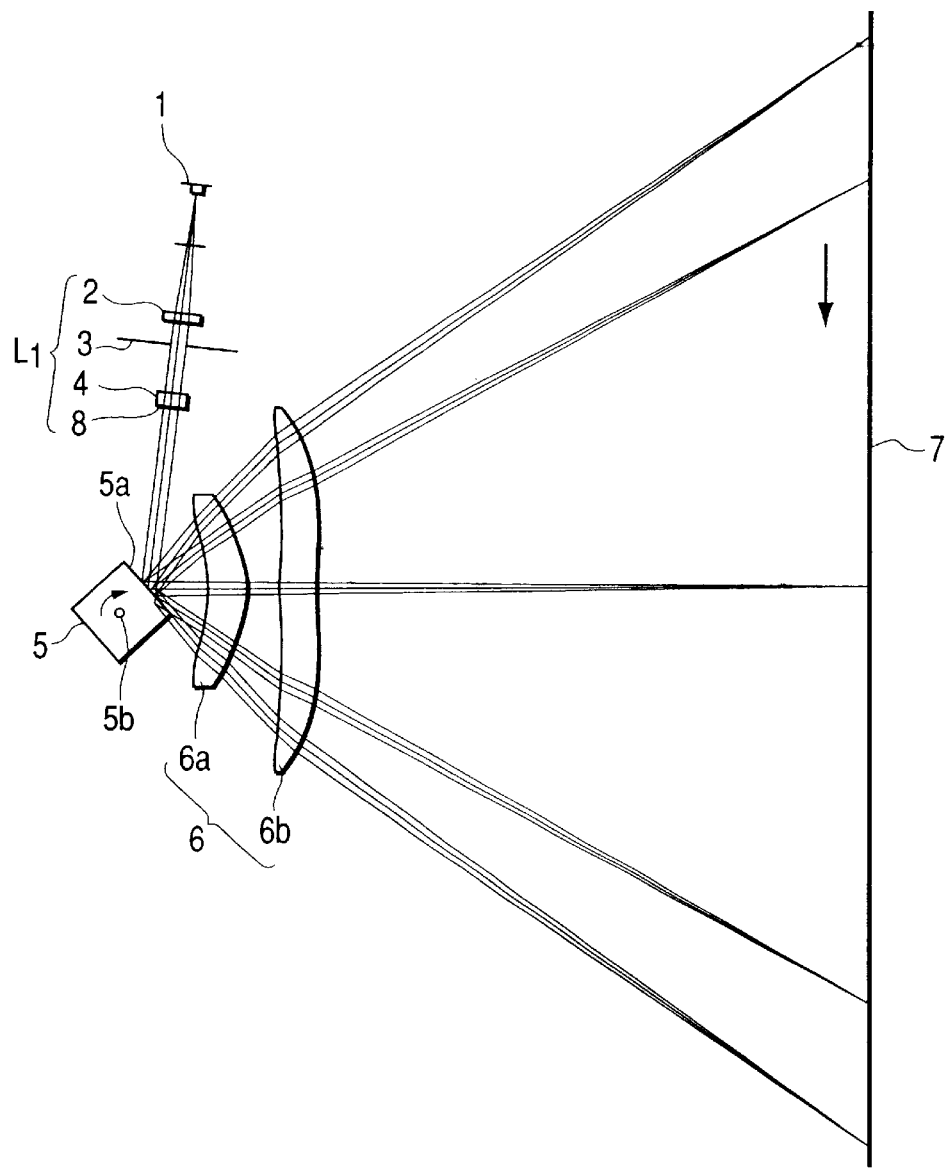
FIG. 1A and FIG. 1B are cross-sectional views of principal part in Embodiment 1 of the present invention.
Figure 1B:
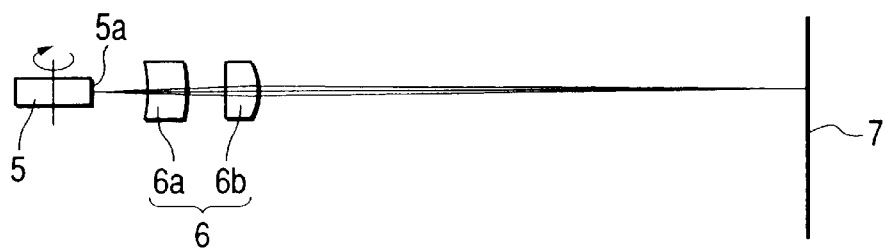

FIG. 1A is a cross-sectional view of principal part in the main scanning direction (a main scanning section) of an application wherein the optical scanning apparatus of Embodiment 1 of the present invention is applied to an image-forming apparatus such as a laser beam printer, a digital copier, or the like, and FIG. 1B is a cross-sectional view of principal part in the sub-scanning direction (a sub-scanning section) of a part of FIG. 1A.

In the figures, light emitted from a semiconductor laser 1 being the light source means travels through a first imaging optical system consisting of a collimator lens 2, a stop 3, and a cylindrical lens 4 to be incident to a deflector means 5. Here the light from the semiconductor laser 1 is converted into a parallel beam by the collimator lens 2, the parallel beam is limited by the stop 3 to enter the cylindrical lens 4, the cylindrical lens 4 transmits the parallel light in the main scanning direction as it is, but converges it in the sub-scanning direction to focus it as a linear image longitudinal in the main scanning direction, on a deflection facet 5a of the deflector means 5.

The deflector means 5 is comprised of a polygon mirror, which is rotated at an equal speed about the rotation center of the rotation axis 5b and which reflectively deflects the light emitted from the semiconductor laser 1. The light reflectively deflected by the polygon mirror 5 is converged in the both main scanning and sub-scanning directions by a second imaging optical system 6 with the fθ characteristic comprised of two fθ lenses 6a, 6b, which are a first fθ lens 6a and a second fθ lens 6b, and optically scans a surface of a photosensitive drum 7 being a surface to be scanned.

In the present embodiment, the cylindrical lens 4 and the two fθ lenses 6a, 6b all are toric lenses, which are made of a plastic material. A cylindrical surface with curvature (R) only in the sub-scanning direction is formed in the semiconductor-laser-1-side surface of the cylindrical lens 4, the polygon-mirror-5-side surface thereof is a plane, and a diffraction grating with power (optical power) only in the sub-scanning direction is formed as a diffraction optical element 8 on the plane.

Table 1 presents numerical values for the structure of the light scanning optical system in the present embodiment. The entrance-side surface of each lens is denoted by R1 and the exit-side surface of each lens by R2.

TABLE 1 structure of light scanning optical system in Embodiment 1

|  | radius of curvature Rs(mm) | surface separation d(mm) | refractive index N |
|---|---|---|---|
| semiconductor laser |  | 23.585 | 1.00000 |
| collimator lens R1 | 182.212 | 2.000 | 1.76203 |
| collimator lens R2 | −20.831 | 13.450 | 1.00000 |
| cylindrical lens R1 (radius of curvature in sagittal direction) | 27.086 | 3.000 | 1.49101 |
| cylindrical lens R1 (radius of curvature in sagittal direction) | ∞ | 35.600 | 1.00000 |
| deflection facet of polygon mirror | ∞ | 10.500 | 1.00000 |
| first fθ lens R1 (radius of curvature in sagittal direction) | −10.000 | 6.500 | 1.52420 |
| first fθ lens R2 (radius of curvature in sagittal direction) | −22.950 | 7.120 | 1.00000 |
| second fθ lens R1 (radius of curvature in sagittal direction) | 110.239 | 6.600 | 1.52420 |
| second fθ lens R2 (radius of curvature in sagittal direction) | −12.117 | 103.280 | 1.00000 |
| surface to be scanned | ∞ |  |  |

The shape of the diffraction grating formed on the R2 surface of the cylindrical lens 4 is represented by Eq. (1) below and the coefficients of the phase terms thereof are presented in Table 2, where $\phi(y,z)$ is a phase function, the origin is set at an intersection with the optical axis, the x-axis is taken along the direction of the optical axis, the y-axis along the axis perpendicular to the optical axis in the main scanning plane, and the z-axis along the axis perpendicular to the optical axis in the sub-scanning plane.

$$\phi(y,z) = (2\pi/\lambda)(c_1 z^2 + c_2 y^2 z^2 + c_3 y^4 z^2) \qquad (1)$$

$C_1$ to $C_3$: phase polynomial coefficients, $\lambda = 780$ nm

TABLE 2

| phase terms of diffraction optical element | |
|---|---|
| $C_1$ | −5.08566E−3 |
| $C_2$ | 0.00000 |
| $C_3$ | 0.00000 |

Next described is the correction for the focus movement on the surface to be scanned 7 due to the change in the oscillation wavelength of the semiconductor laser 1 and due to the change in the ambient temperature.

First described referring to FIG. 2 are the principles of the correction for the focus movement in the sub-scanning direction in the present embodiment. FIG. 2 is a cross-sectional view of the main part wherein the optical paths in the sub-scanning direction of the light scanning optical system of the present embodiment are expanded, which shows a state of imaging relation between in a reference state (solid lines) and in a state with correction for focus (dashed lines).

For example, suppose there was an increase of the ambient temperature in the light scanning optical system. The cylindrical lens 4 and fθ lenses 6a, 6b are made of plastic, and in general, plastic has the property of lowering the refractive index with increase in temperature. For this reason, the refractive power of the overall system decreases, so that the focus position in the sub-scanning direction moves from point P to point Q in the drawing away from the surface to be scanned 7, so as to cause focus deviation.

However, the semiconductor laser 1 has the property of increasing its oscillation wavelength with increase in the temperature. The longer the oscillation wavelength, the larger the angles of diffraction at the diffraction optical element 8 become. This causes the linear image originally located at a point R near the deflective reflection facet 5a of the polygon mirror 5, to move to the position of a point S on the semiconductor laser 1 side.

Then, the focus position, which was to move to the point Q mainly because of the decrease of the refractive index of the cylindrical lens 4 and fθ lenses 6a, 6b, is returned again to the point P. Namely, this effects temperature compensation.

There is also dispersion of the oscillation wavelength in the initial state among semiconductor lasers 1 and the operating wavelength differs depending upon the individual semiconductor lasers used.

For example, suppose there was change in the initial wavelength of the semiconductor laser 1 and the operating wavelength became longer than the reference wavelength. The lenses including the collimator lens 2, the cylindrical lens 4, the fθ lenses 6a, 6b, and so on have the property of lowering the refractive index with increase in the operating wavelength, and the focus position in the sub-scanning direction moves from the point P to the position of the point Q, so as to cause focus deviation.

However, the longer the operating wavelength, the larger the angles of diffraction become at the diffraction optical element 8. This increases the power of the diffraction optical element to return the focus position, which was to move to the point Q as described above, to the position of the point P. Namely, color compensation is effected.

Based on the principles as described above, the present embodiment achieves well-balanced correction between the focus movement due to the change in the ambient temperature and the focus movement due to the initial wavelength change in the oscillation wavelength of the light source means occurring independently of each other, by optimally setting the power of the diffraction optical element 8 in the sub-scanning direction.

The present embodiment will be described further below using specific numerical values.

Focus variation will be compared among various types of diffraction optical elements under the conditions that the focal length (in the sub-scanning section) of the cylindrical lens 4 in the present embodiment is fcl=35.81 mm, the lens back thereof is Sk_cl=34.50 mm, the initial wavelength variation of the light source means 1 is ±15 nm, the change of the ambient temperature is ±25° C.

Under these circumstances, the temperature coefficient of the wavelength change of the semiconductor laser as the light source means is 0.255 nm/° C., the wavelength change with the ambient temperature change of +25° C. is +6.375 nm, the refractive index change of the cylindrical lens 4 and fθ lenses 6a, 6b with the ambient temperature change of +25° C. is −0.00198, and the refractive index change with the wavelength change of +6.375 nm is −0.00014.

The lens barrel of the collimator lens 2 is made of two types of resin, one of which is noryl (modified PPO) having the coefficient of linear expansion of 2.3 and the other of which is polysulfone having the coefficient of linear expansion of 5.6. With the ambient temperature change of +25° C., the position of the collimator lens moves 19.4 μm toward the polygon mirror.

Then let us define focus movement amounts caused by the respective optical elements as follows. With the wavelength change of 6.375 nm due to the ambient temperature change of the light source means 1, Col λ1 represents a focus movement amount by the collimator lens 2, CL R λ1 a focus movement amount by the refracting surface of the cylindrical lens 4, CL DOE λ1 a focus movement amount by the diffracting surface of the cylindrical lens 4, and fθ λ1 a focus movement amount by the fθ lens unit 6; with the refractive index change due to the ambient temperature change of 25° C., CL RN represents a focus movement amount by the refracting surface of the cylindrical lens 4, and fθ N a focus movement amount by the fθ lens unit 6.

With the initial wavelength change of 15 nm of the semiconductor laser 1, Col λ2 represents a focus movement amount by the collimator lens 2, CL R λ2 a focus movement amount by the refracting surface of the cylindrical lens 4, CL DOE λ2 a focus movement amount by the diffracting surface of the cylindrical lens 4, and fθ λ2 a focus movement amount by the fθ lens unit 6.

It is, however, noted that the focus movement amount Col λ2 by the collimator lens 2 with the initial wavelength change of the semiconductor laser 1 is canceled, because the focus adjustment of the collimator lens 2 is carried out on the occasion of mounting the semiconductor laser 1 and the collimator lens 2 into a light source unit.

In the present embodiment, a type in which the power of the diffraction optical element 8 (first power) is set so as not to cause focus movement even with change of the oscillation wavelength of the light source means 1 from the reference wavelength, will be referred to hereinafter as an achromatic type.

The focus movement amounts by the respective components in the case of the achromatic type are presented in Table 3 below.

TABLE 3 focus movement of achromatic type

| with ambient temperature change of +25° C. | | with initial wavelength change of +15 nm | |
|---|---|---|---|
| CL R λ1 (focus movement amount by refracting surface of cylindrical lens) | 0.099 (mm) | CL R λ2 | 0.233 (mm) |
| CL R N (focus movement amount with refractive index change of cylindrical lens) | 1.403 | | |
| CL DOE λ1 (focus movement amount by diffracting surface of cylindrical lens) | −0.226 | CL DOE λ2 | −0.531 |
| Col λ1 (focus movement amount by collimator lens) | 0.170 | | |
| Col d (focus movement amount with wavelength change of collimator lens) | −0.451 | | |
| fθ λ1 (focus movement amount by fθ lens 6) | 0.126 | fθ λ2 | 0.298 |
| fθ N (focus movement amount with refractive index change of fθ lens 6) | 1.788 | | |
| focus movement amount with ambient temperature change of +25° C. | 2.910 | focus movement amount with initial wavelength change of 15 nm | 0.000 |

In the achromatic type the focus movement amount is large with the ambient temperature change, so as to cause heavy degradation of performance. Further, since the ambient temperature change is the phenomenon that can occur in any optical scanning apparatus, different from the dispersion of the oscillation wavelength of the light source means, it is desirably set to a relatively small value.

A type in which the power of the diffraction optical element (second power) is set so as not to cause the focus movement with the ambient temperature change and in which the lens back of the cylindrical lens 4 is the same as Sk_cl=34.50 mm, will be referred to hereinafter as an overall temperature compensation type.

The focus movement amounts by the respective components in the case of the overall temperature compensation type are presented in Table 4.

TABLE 4 focus movement of overall temperature

| with ambient temperature change of +25° C. | | with initial wavelength change of +15 nm | |
|---|---|---|---|
| CL R λ1 | 0.032 (mm) | CL R λ2 | 0.076 (mm) |
| CL R N | 0.458 | | |
| CL DOE λ1 | −2.125 | CL DOE λ2 | −4.999 |
| Col λ1 | 0.170 | | |
| Col d | −0.451 | | |
| fθ λ1 | 0.126 | fθ λ2 | 0.298 |
| fθ N | 1.788 | | |
| focus movement amount with ambient temperature change of +25° C. | 0.000 | focus movement amount with initial wavelength change of 15 nm | −4.625 |

Since in the overall temperature compensation type the focus movement amount due to the dispersion of the initial wavelength of the light source means is too large, it takes most of the designed depth, so as to heavily lower non-defective percentage of optical scanning apparatus and thus pose the problem of cost increase.

Therefore, the power of the diffraction optical element is set to a type (in which the power of the diffraction optical element will be referred to as third power) located between the achromatic type and the overall temperature compensation type to make a balance between the focus movement amount due to the initial wavelength change of the light from the light source means and the focus movement amount due to the ambient temperature change, thereby decreasing the focus movement amount on the surface to be scanned.

Namely, this realizes the optical scanning apparatus with less variation in the spot size.

Since in the present embodiment the diffraction grating is formed only on the cylindrical lens 4, the type of the power of the diffraction optical element (either the achromatic type, the overall temperature compensation type, or the type between them) can be discriminated by finding the variation amount of the lens back of the cylindrical lens 4 due to the ambient temperature change.

Table 5 shows the relation of focus movement amounts on the surface to be scanned, with the types of power of the diffraction optical element.

TABLE 5

FOCUS MOVEMENT AMOUNT IN SUB-SCANNING SECTION dΔS(mm)

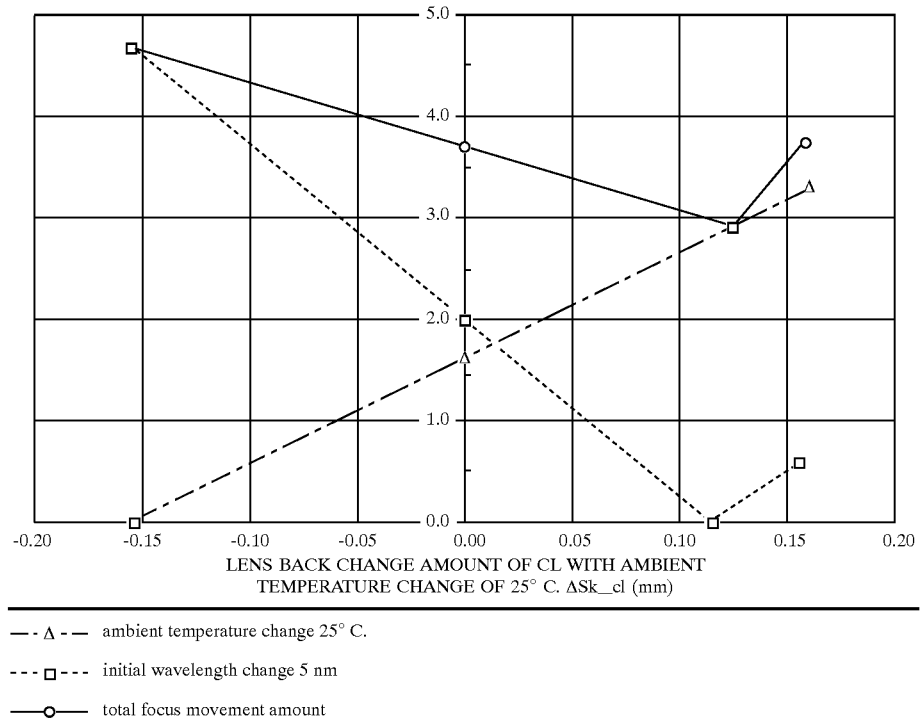

— · △ · — ambient temperature change 25° C.

- - - □ - - - initial wavelength change 5 nm

———○——— total focus movement amount

With the change of ambient temperature of +25° C., the lens back variation amount of the cylindrical lens is ΔSk_cl=+0.12 mm in the achromatic type and ΔSk_cl=−0.16 in the overall temperature compensation type. Namely, a balance can be made between the focus movement amount due to the initial wavelength change of the light source means and the focus movement amount due to the ambient temperature change by setting the variation of the lens back of the cylindrical lens with the change of ambient temperature of +25° C., ΔSk_cl, in the range of +0.12 to −0.16.

In the present embodiment they are balanced by setting the variation amount of the lens back of the cylindrical lens with the change of ambient temperature of +25° C. to $\Delta Sk\_cl=0.00$.

From computation based on the results of Table 1 and Table 2 in Embodiment 1, the refractive power $\phi 1$ of the R1 surface of the cylindrical lens is 0.01813 and the diffractive power $\phi 2$ of the R2 surface of the cylindrical lens is 0.01017. Hence the power ratio is $\phi 2/\phi 1=0.561$. With $e=d/N$, $\phi=1/f=\phi 1+\phi 2-e\cdot\phi 1\cdot\phi 2$, where f is the focal length, N the refractive index of the cylindrical lens, and d the surface separation of the cylindrical lens; and $\Delta=Sk-f$ where Sk is the lens back.

Table A below also presents the power ratios of the achromatic type and the overall temperature compensation type as comparative examples.

C2 and C3 of the achromatic type and the overall temperature compensation type are the phase polynomial coefficients, which are zero as in Table 2.

As apparent from Table A below, the present embodiment meets the relation of $\phi 2$ of the achromatic type (first power) $<\phi 2$ of Embodiment 1 (third power)$<\phi 2$ of the overall temperature compensation type (second power).

TABLE A

| | Embodiment 1 | Comparative example 1: achromatic type (first power) | Comparative example 2: overall temperature compensation type (second power) |
|---|---|---|---|
| R1 | 27.086 | 19.307 | 59.106 |
| DOE C1 | −5.0856 E−03 | −1.09122 E−03 | −1.02685 E−02 |
| d | 3.000 | 3.000 | 3.000 |
| N | 1.491014 | 1.491014 | 1.491014 |
| $\phi 1$ | 0.01813 | 0.02543 | 0.00831 |
| $\phi 2$ | 0.01017 | 0.00218 | 0.02054 |
| e | 2.012 | 2.012 | 2.012 |
| $\phi$ | 2.79 E−02 | 2.75 E−02 | 2.85 E−02 |
| f | 35.806 | 36.361 | 35.086 |
| $\Delta$ | −1.306 | −1.861 | −0.586 |
| Sk | 34.500 | 34.500 | 34.500 |
| $\Delta Sk$ | 0.00 | 0.12 | −0.16 |
| power ratio | 0.561 | 0.086 | 2.472 |

Table 6 below presents the focus movement amounts by the respective components in the light scanning optical system of the type of the diffraction optical element wherein the power of the diffraction optical element of the present embodiment is the third power.

TABLE 6

| focus movement in Embodiment 1 | | | |
|---|---|---|---|
| with ambient temperature change of +25° C. | | with initial wavelength change of +15 nm | |
| CL R $\lambda 1$ | 0.071 (mm) | CL R $\lambda 2$ | 0.166 (mm) |
| CL R N | 1.000 | | |
| CL DOE $\lambda 1$ | −1.052 | CL DOE $\lambda 2$ | −2.476 |
| Col $\lambda 1$ | 0.170 | | |
| Col d | −0.451 | | |
| f$\theta$ $\lambda 1$ | 0.126 | f$\theta$ $\lambda 2$ | 0.298 |
| f$\theta$ N | 1.788 | | |
| focus movement amount with ambient temperature change of +25° C. | 1.652 | focus movement amount with initial wavelength change of 15 nm | −2.012 |

In this case, the focus movement amount due to the initial wavelength change of +15 nm of the light source means is $d\Delta S=-2.012$ mm and the focus movement amount due to the ambient temperature change of +25° C. is $d\Delta S=+1.652$ mm, thereby making a balance between the two focus movement amounts. Since the initial wavelength change of the light source means and the ambient temperature change both can also appear reverse, the focus movement amount is considered by its absolute value.

In the present embodiment this permits the cylindrical lens 4 to be placed without adjustment of focus in the direction of the optical axis, thus achieving advantages of reduction of assembling time, decrease of tools, etc., as well as the cost merit.

Embodiment 2

A principal difference of Embodiment 2 from Embodiment 1 is that the type of power of the diffraction optical element is changed while the lens back of the cylindrical lens 2 is kept at the same as $Sk\_cl=34.50$ mm.

The type of power of the diffraction optical element was set so that the lens back variation amount of the cylindrical lens with the change of ambient temperature of +25° C. was $\Delta Sk\_cl=+0.02$ mm.

Let $d\Delta S\lambda\_T$ be a focus change amount with change of ambient temperature of 25° C. in the light scanning optical system wherein the power of the diffraction optical element is set to the achromatic type in Table 3, $d\Delta ST\_\lambda$ be a focus change amount with change of 15 nm in the initial wavelength of the light from the light source means 1 in the light scanning optical system wherein the power is set to the overall temperature compensation type in Table 4, $d\Delta S\_\lambda$ be a focus change amount with change of 15 nm in the initial wavelength of the light from the light source means in the light scanning optical system wherein the diffraction optical element is set to a certain type, and $d\Delta S\_T$ be a focus change amount with change of ambient temperature of 25° C. in the light scanning optical system with the diffraction optical element of the certain tape. In the present embodiment, since $|d\Delta S\lambda\_T|<|d\Delta ST\_\lambda|$, the apparatus is set so as to satisfy the following relation:

$$|d\Delta S\_T| \geq |d\Delta S\_\lambda|.$$

The configuration of the cylindrical lens 4 in the present embodiment is presented in Table 7 below.

TABLE 7 configuration of cylindrical lens

| | |
|---|---|
| radius of curvature in sagittal direction of incidence surface | 25.373 | phase terms of diffraction optical element

| | |
|---|---|
| $C_1$ | −4.42494E−3 |
| $C_2$ | 0.00000 |
| $C_3$ | 0.00000 |

Table 8 below shows the focus change amounts by the respective components in the light scanning optical system with the type of the diffraction optical element.

TABLE 8 focus movement in Embodiment 2

| with ambient temperature change of +25° C. | | with initial wavelength change of +15 nm | |
|---|---|---|---|
| CL R λ1 | 0.075 (mm) | CL R λ2 | 0.178 (mm) |
| CL R N | 1.068 | | |
| CL DOE λ1 | −0.916 | CL DOE λ2 | −2.154 |
| Col λ1 | 0.170 | | |
| Col d | −0.451 | | |
| fθ λ1 | 0.126 | fθ λ2 | 0.298 |
| fθ N | 1.788 | | |
| focus movement amount with ambient temperature change of +25° C. | 1.861 | focus movement amount with initial wavelength change of 15 nm | −1.679 |

In the present embodiment, the focus movement amount due to the ambient temperature change is $d\Delta S\_T = 1.861$ mm, the focus movement amount due to the initial wavelength change of the light source means is $d\Delta S\_\lambda = 1.679$ mm, so as to make a balance between the focus movement amounts due to the two factors, and the sum of the focus movement amounts is controlled to the small value of 3.540 mm.

From computation based on the results of Table 7 and Table 8 in Embodiment 2, the refractive power $\phi1$ of the R1 surface of the cylindrical lens is 0.01935 and the diffractive power $\phi2$ of the R2 surface of the cylindrical lens is 0.00885. Hence the power ratio is $\phi2/\phi1 = 0.457$. With $e = d/N$, $\phi = 1/f = \phi1 + \phi2 − e \cdot \phi1 \cdot \phi2$, where f is the focal length, N the refractive index of the cylindrical lens, and d the surface separation of the cylindrical lens; and $\Delta = Sk − f$ where Sk is the lens back.

Table B below also presents the power ratios of the achromatic type and the overall temperature compensation type as comparative examples.

As apparent from Table A and Table B below, the present embodiment meets the relation of $\phi2$ of the achromatic type (first power) < $\phi2$ of Embodiment 2 (third power) < $\phi2$ of the overall temperature compensation type (second power).

TABLE B

Embodiment 2

| | |
|---|---|
| R1 | 25.373 |
| DOE C1 | −4.42494E−03 |
| d | 3.000 |
| N | 1.491014 |
| $\phi1$ | 0.001935 |
| $\phi2$ | 0.00885 |
| e | 2.012 |
| $\phi$ | 2.79E−02 |
| f | 35.897 |
| $\Delta$ | −1.398 |
| Sk | 34.500 |
| $\Delta$Sk | 0.02 |
| power ratio | 0.457 |

This allows us to construct the optical scanning apparatus capable of always providing good images while reducing variation in the spot size on the surface to be scanned, even with the ambient temperature change and/or with the initial wavelength change.

Embodiment 3

Main differences of Embodiment 3 from Embodiment 1 are that the light source means 1 is one with less dispersion of initial wavelength, ±5 nm, and that the type of power of the diffraction optical element 8 is changed while keeping the lens back of the cylindrical lens 4 at the same as Sk_cl = 34.50 mm.

The type of power of the diffraction optical element 8 was set so that the lens back variation amount of the cylindrical lens 4 with the change of ambient temperature of +25° C. became $\Delta Sk\_cl = −0.10$ mm.

The cylindrical lens 4 of the present embodiment is constructed in the structure presented in Table 9 below.

TABLE 9 configuration of cylindrical lens

| | |
|---|---|
| radius of curvature in sagittal direction of incidence surface | 41.369 | phase terms of diffraction optical element

| | |
|---|---|
| $C_1$ | −8.41292E−3 |
| $C_2$ | 0.00000 |
| $C_3$ | 0.00000 |

Table 10 presents the relation of focus movement amounts on the surface to be scanned 7, with the types of power of the diffraction optical element 8.

TABLE 10

FOCUS MOVEMENT AMOUNT IN SUB-SCANNING SECTION dΔS(mm)

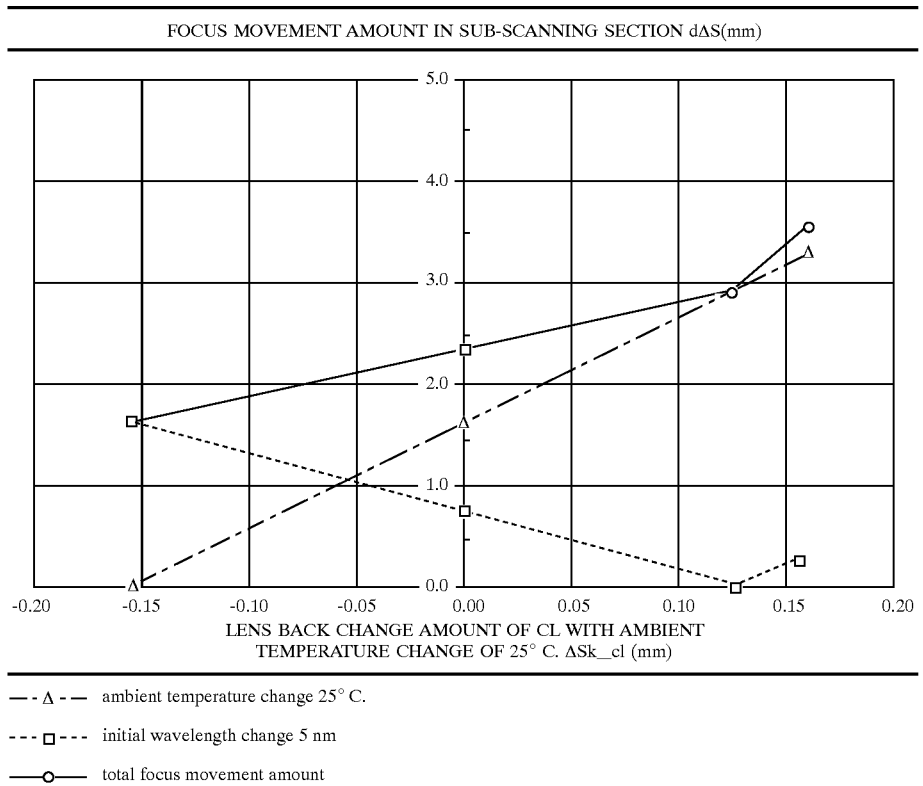

— - △ - — ambient temperature change 25° C.

- - - ☐ - - - initial wavelength change 5 nm

———○——— total focus movement amount

Under the aforementioned conditions, the focus movement amount is $d\Delta S\lambda\_T=2.910$ mm with the change of ambient temperature of 25° C. in the light scanning optical system wherein the power of the diffraction optical element 8 is set to the achromatic type ($\Delta Sk\_cl=0.12$ mm), and the focus movement amount is $d\Delta ST\_\lambda=1.542$ mm with the change of 5 nm in the initial wavelength of the light source means 1 in the light scanning optical system wherein the power of the diffraction optical element 8 is set to the overall temperature compensation type ($\Delta Sk\_cl=-0.16$ mm).

From computation based on the results of Table 9 of Embodiment 3, the refractive power $\phi 1$ of the R1 surface of the cylindrical lens is 0.01187 and the diffractive power $\phi 2$ of the R2 surface of the cylindrical lens is 0.01683. Hence the power ratio is $\phi 2/\phi 1=1.418$. With $e=d/N$, $\phi=1/f=\phi 1+\phi 2-e\cdot\phi 1\cdot\phi 2$, where f is the focal length, N the refractive index of the cylindrical lens, and d the surface separation of the cylindrical lens; and $\Delta=Sk-f$ where Sk is the lens back.

As apparent from Table A and Table C below, the present embodiment meets the relation of $\phi 2$ of the achromatic type (first power)<$\phi 2$ of Embodiment 3 (third power)<$\phi 2$ of the overall temperature compensation type (second power).

TABLE C

| Embodiment 3 | |
|---|---|
| R1 | 41.369 |
| DOE C1 | −8.41292E−03 |
| d | 3.000 |
| N | 1.491014 |
| $\phi 1$ | 0.001187 |

TABLE C-continued

| Embodiment 3 | |
|---|---|
| $\phi 2$ | 0.001683 |
| e | 2.012 |
| $\phi$ | 2.83E−02 |
| f | 35.344 |
| Δ | −0.844 |
| Sk | 34.500 |
| ΔSk | −0.10 |
| power ratio | 1.418 |

In the present embodiment, since $$|d\Delta S\lambda\_T|>|d\Delta ST\_\lambda|,$$

the apparatus is set so as to satisfy the following relation:

$$|d\Delta S\_T|\leq|d\Delta S\_\lambda|.$$

Table 11 below presents the focus movement amounts by the respective components in the light scanning optical system with the type of the diffraction optical element 8 in the present embodiment.

TABLE 11 focus movement in Embodiment 3

| | with ambient temperature change of +25° C. | | with initial wavelength change of +15 nm | |
|---|---|---|---|---|
| CL R λ1 | 0.046 | (mm) | CL R λ2 | 0.036 (mm) |
| CL R N | 0.655 | | | |
| CL DOE λ1 | −1.741 | | CL DOE λ2 | −1.365 |
| Col λ1 | 0.170 | | | |
| Col d | −0.451 | | | |
| fθ λ1 | 0.126 | | fθ λ2 | 0.099 |
| fθ N | 1.788 | | | |
| focus movement amount with ambient temperature change of +25° C. | 0.594 | | focus movement amount with initial wavelength change of 15 nm | −1.230 |

In the present embodiment, the focus movement amount due to the ambient temperature change is dΔS_T=0.594 mm and the focus change amount due to the initial wavelength change of the light source means 1 is dΔS_λ=−1.230 mm, so as to make a balance between the focus movement amounts due to the two factors. In the light scanning optical system wherein the operating wavelength is λ=775 nm because of change of the initial wavelength of the light source means 1, Δλ=−5 nm, from the reference wavelength λ$_0$=780 nm, when the ambient temperature changes by ΔT=+25° C. from the ordinary temperature T$_o$=25° C. to T=50° C., the focus movement due to the initial wavelength change of the light source means 1 and the focus change due to the ambient temperature change occur in the same direction away from the light source means, and thus variation of the spot size can be restrained by also decreasing the total of the focus movement. The present embodiment implements it.

Figure 3:
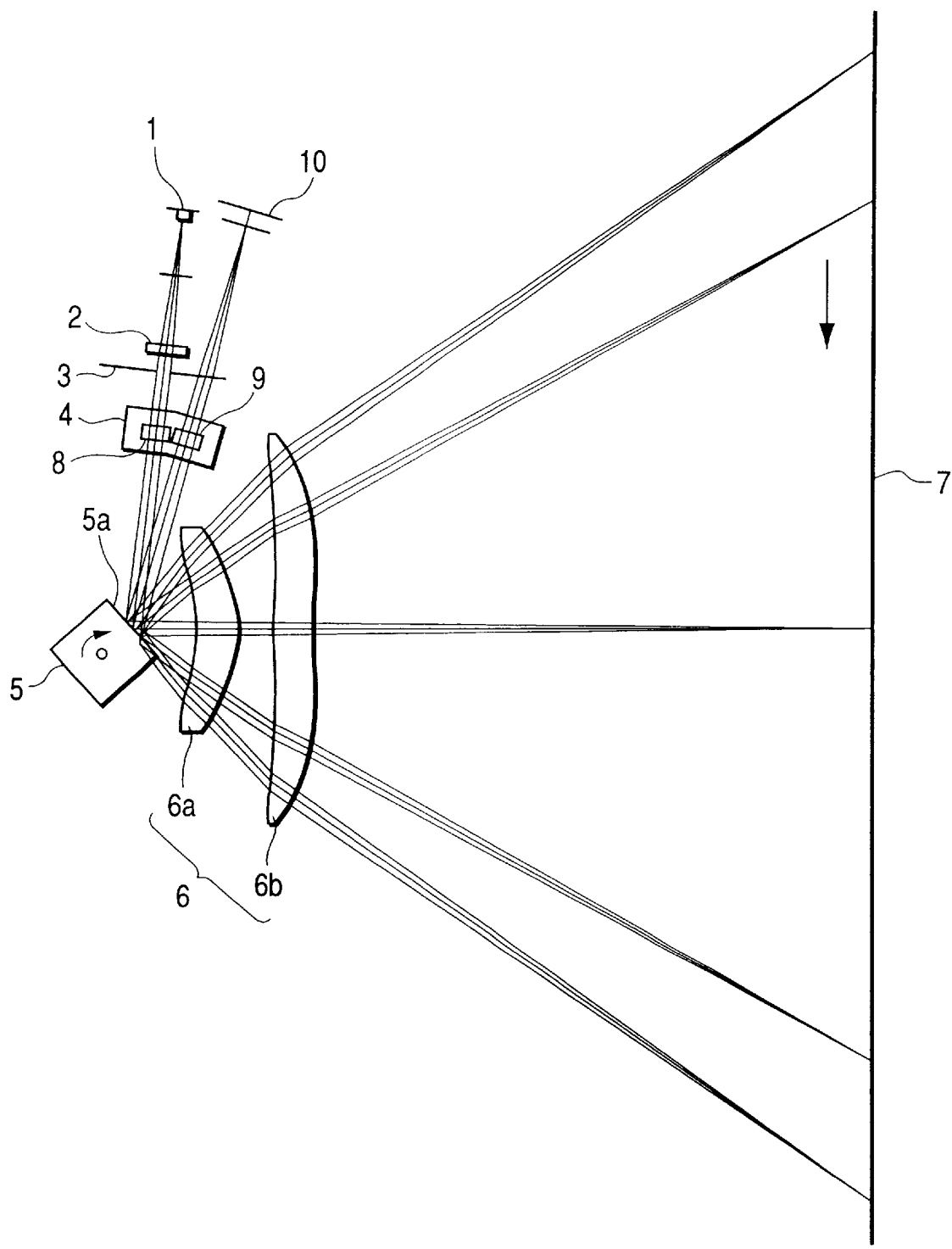
FIG. 3 is a cross-sectional view of principal part in the main scanning direction in Embodiment 3 of the present invention.
Figure 5:
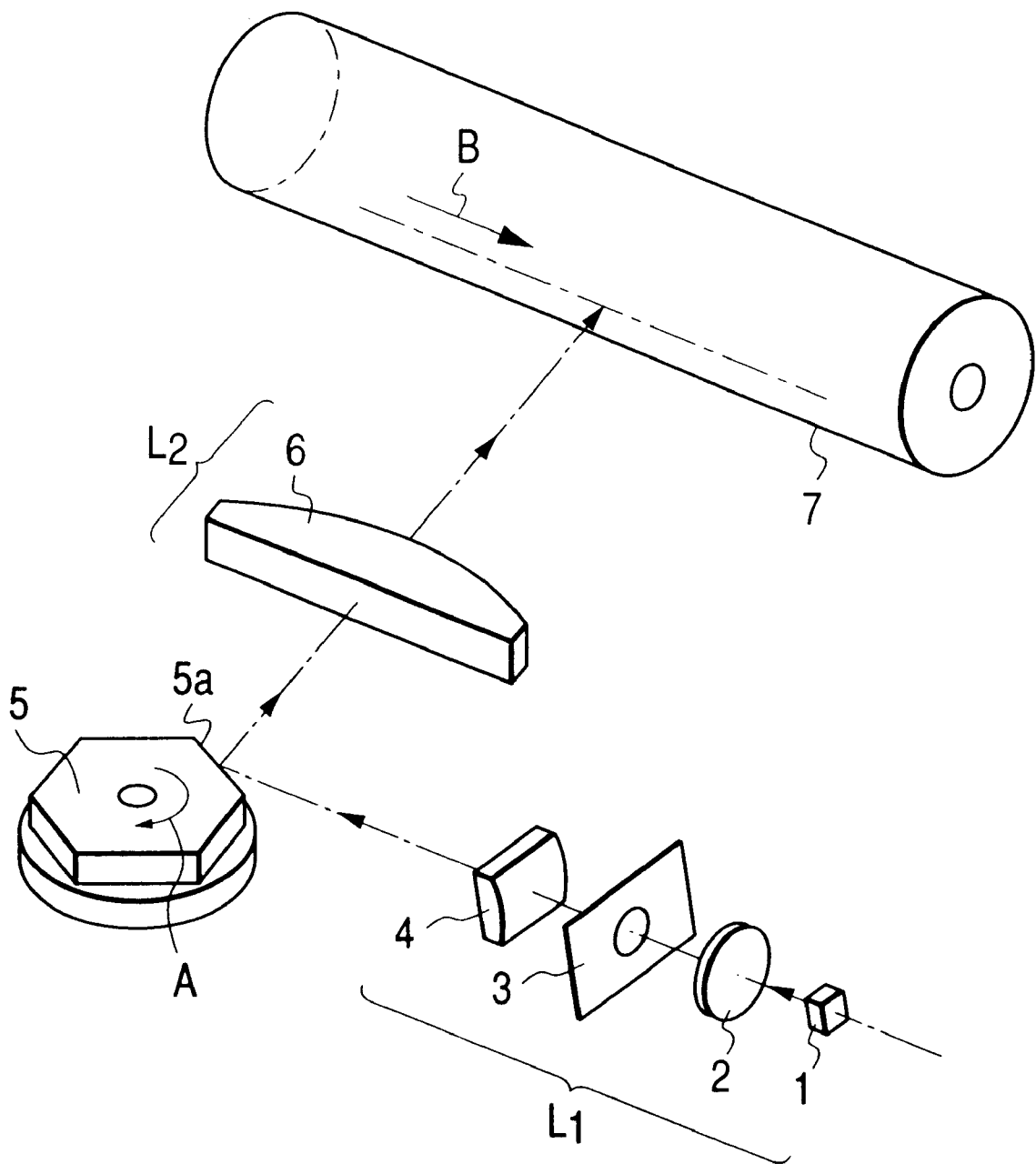
FIG. 5 is a schematic diagram of principal part in the conventional light scanning optical system.

Further, FIG. 3 is a cross-sectional view in the main scanning direction of the optical scanning apparatus in Embodiment 3.

The light scanning optical system of the present embodiment is provided with a third imaging optical system 9 for detecting a synchronous signal of scanning, which includes an imaging lens 9 for guiding the light deflected by the polygon mirror 5, to a synchronism detection means 10. The imaging lens 9 is made of plastic so as to be integral with the cylindrical lens 4, which can decrease the number of components, thereby realizing cost reduction of the optical scanning apparatus.

Embodiment 4

A main difference between Embodiment 4 and Embodiment 1 is that the lens back of the cylindrical lens 4 is Sk_cl=20.00 mm.

The type of the diffraction optical element is the same as in Embodiment 1 and the change amount of the lens back of the cylindrical lens with the change of ambient temperature of +25° C. is ΔSk_cl=0.00.

The configuration of the cylindrical lens in the present embodiment is presented in Table 12 below.

TABLE 12 configuration of cylindrical lens

| radius of curvature in sagittal direction of incidence surface | 16.211 (mm) |
|---|---|
| phase terms of diffraction optical element | |
| C$_1$ | −8.87256E−3 |
| C$_2$ | 0.00000 |
| C$_3$ | 0.00000 |

From computation based on the results of Table 12 of Embodiment 4, the refractive power φ1 of the R1 surface of the cylindrical lens is 0.03029 and the diffractive power φ2 of the R2 surface of the cylindrical lens is 0.01775. Hence the power ratio is φ2/φ1=0.586. With e=d/N, φ=1/f=φ1+φ2−e·φ1·φ2, where f is the focal length, N the refractive index of the cylindrical lens, and d the surface separation of the cylindrical lens; and Δ=Sk−f where Sk is the lens back.

TABLE D

Embodiment 4

| R1 | 16.211 |
|---|---|
| DOE C1 | −8.87256E−03 |
| d | 3.000 |
| N | 1.491014 |
| φ1 | 0.03029 |
| φ2 | 0.01775 |
| e | 2.012 |
| φ | 4.70E−02 |
| f | 21.298 |
| Δ | −1.298 |
| Sk | 20.000 |
| ΔSk | −0.00 |
| power ratio | 0.586 |

Table 13 below presents the focus change amounts by the respective components in the light scanning optical system with the type of the diffraction optical element.

TABLE 13 focus movement in Embodiment 4

| | with ambient temperature change of +25° C. | | with initial wavelength change of +15 nm | |
|---|---|---|---|---|
| CL R λ1 | 0.041 | (mm) | CL R λ2 | 0.095 (mm) |
| CL R N | 0.574 | | | |
| CL DOE λ1 | −0.627 | | CL DOE λ2 | −1.475 |
| Col λ1 | 0.056 | | | |
| Col d | −0.158 | | | |
| fθ λ1 | 0.126 | | fθ λ2 | 0.298 |
| fθ N | 1.788 | | | |
| focus movement amount with ambient temperature change of +25° C. | 1.808 | | focus movement amount with initial wavelength change of 15 nm | −1.082 |

In the present embodiment, the lens back of the cylindrical lens is changed from that of Embodiment 1. When this is compared by focal lengths, fcl=35.81 mm in Embodiment 1, whereas fcl=21.30 mm in the present embodiment.

This permits the focus movement amount due to change of operating wavelength to be controlled to a small amount by setting the focal length of the cylindrical lens shorter. This is because the movement amount of the focal line position after passage through the cylindrical lens due to the wavelength change becomes smaller and because the focus movement amount calculated by multiplying the movement amount of the focal line position by the longitudinal magnification αs=11.04 of the second imaging lens in the sub-scanning direction, becomes smaller.

When the focal length of the cylindrical lens having the diffraction optical element is fcl and the longitudinal magnification of the second imaging optical system 6 in the sub-scanning direction is αs, correction can be made in the level where no problem occurs in practical use, within the range satisfying Eq. (2) below.

$$fcl \leq 500/\alpha s \quad (2)$$

Embodiment 5

FIG. 4 is a cross-sectional view in the sub-scanning direction of the optical scanning apparatus in Embodiment 5.

In the present embodiment, the cylindrical lens 4 and two fθ lenses 6a, 6b are made of synthetic resin, the semiconductor-laser-1-side surface of the cylindrical lens 4 is a cylindrical surface with curvature (R) only in the sub-scanning direction, the polygon-mirror-5-side surface of the fθ lens 6b is a plane, and the diffraction optical element 8 with power only in the sub-scanning direction is formed on the plane.

The configuration of the light scanning optical system of the present embodiment is presented in Table 14 and the shape of the diffraction optical element formed on the incidence surface of the second fθ lens 6b in Table 15.

TABLE 14 structure of light scanning optical system in Embodiment 5

| | radius of curvature Rs (mm) | surface separation d (mm) | refractive index N |
|---|---|---|---|
| semiconductor laser | | 23.585 | 1.00000 |
| collimator lens R1 | 182.212 | 2.000 | 1.76203 |
| collimator lens R2 | −20.831 | 13.450 | 1.00000 |
| cylindrical lens R1 (radius of curvature in sagittal direction) | −19.117 | 3.000 | 1.52420 |
| cylindrical lens R1 (radius of curvature in sagittal direction) | ∞ | 35.600 | 1.00000 |
| deflection facet of polygon mirror | ∞ | 10.500 | 1.00000 |
| first fθ lens R1 (radius of curvature in sagittal direction) | −10.000 | 6.500 | 1.52420 |
| first fθ lens R2 (radius of curvature in sagittal direction) | −22.950 | 7.120 | 1.00000 |
| second fθ lens R1 (radius of curvature in sagittal direction) | ∞ | 6.600 | 1.52420 |
| second fθ lens R2 (radius of curvature in sagittal direction) | −14.300 | 103.280 | 1.00000 |
| surface to be scanned | ∞ | | |

TABLE 15 phase terms of diffraction optical element

| $C_1$ | −6.75000E−3 |
|---|---|
| $C_2$ | 0.00000 |
| $C_3$ | 0.00000 |

In the present embodiment the ambient temperature change and the initial wavelength change of the light source means are similar to those in Embodiment 1. In the present embodiment the diffraction optical element 8 is formed on one surface in the second imaging means and the type of power of the diffraction optical element 8 can be defined by the direction of focus movement.

In the present embodiment, the power of the diffraction optical element 8 is determined so that correction is insufficient for the focus movement due to the ambient temperature change and correction is over for the focus movement due to the initial wavelength change of the light source means.

Namely, the power is set between the achromatic type and the overall temperature compensation type, as in Embodiment 1.

In the light scanning optical system with the type of the diffraction optical element in the present embodiment, where fθ DOE λ represents the focus movement at the diffracting surface of the fθ lens with the initial wavelength change of the light source means, the focus movement amounts by the respective components are as follows.

TABLE 16 focus movement in Embodiment 5

| with ambient temperature change of +25° C. | | with initial wavelength change of +15 nm | |
|---|---|---|---|
| CL R λ1 | 0.114 (mm) | CL R λ2 | 0.267 (mm) |
| CL R N | 1.608 | | |
| Col λ1 | 0.189 | | |
| Col d | −0.501 | | |
| fθ λ1 | 0.094 | fθ λ2 | 0.221 |
| fθ N | 1.381 | | |
| fθ DOE λ1 | −0.930 | fθ DOE λ2 | −2.189 |
| focus movement amount with ambient temperature change of +25° C. | 1.905 | focus movement amount with initial wavelength change of 15 nm | −1.700 |

In the present embodiment, the focus movement amount with the change of ambient temperature of 25° C. is dΔS__T=1.905 mm and the focus movement amount with the change of 15 nm in the initial wavelength of the light source means is dΔS__λ=1.700 mm, whereby well-balanced correction can be made for the two focus movement amounts even in the case wherein the diffraction optical element 8 is placed in the second imaging optical system.

Degrees of design freedom of the fθ lens can be increased by placing the diffraction optical element on the fθ lens as in the present embodiment.

Concerning the optical scanning apparatus in the respective embodiments, the above described the methods of effecting the balanced correction for the focus movement in the sub-scanning direction due to the ambient temperature change and due to the initial wavelength change of the light source means by using one diffraction optical element in the first or second imaging optical system and setting the power thereof to the optimum value, but the diffraction optical element does not have to be limited to one; for example, two diffraction optical elements can be provided on the cylindrical lens in the first imaging optical system and on the fθ lens in the second imaging optical system, or three diffraction optical elements can be provided on the collimator lens in the first imaging optical system and on the first fθ lens and second fθ lens in the second imaging optical system.

The focus movement in the sub-scanning direction was described in the embodiments of the present invention, but it should be noted that the focus movement in the main scanning direction can also be corrected readily, of course, by using the diffraction optical element having the diffraction action in the main scanning direction.

Described next is an image-forming apparatus applied to the present invention.

Figure 6:
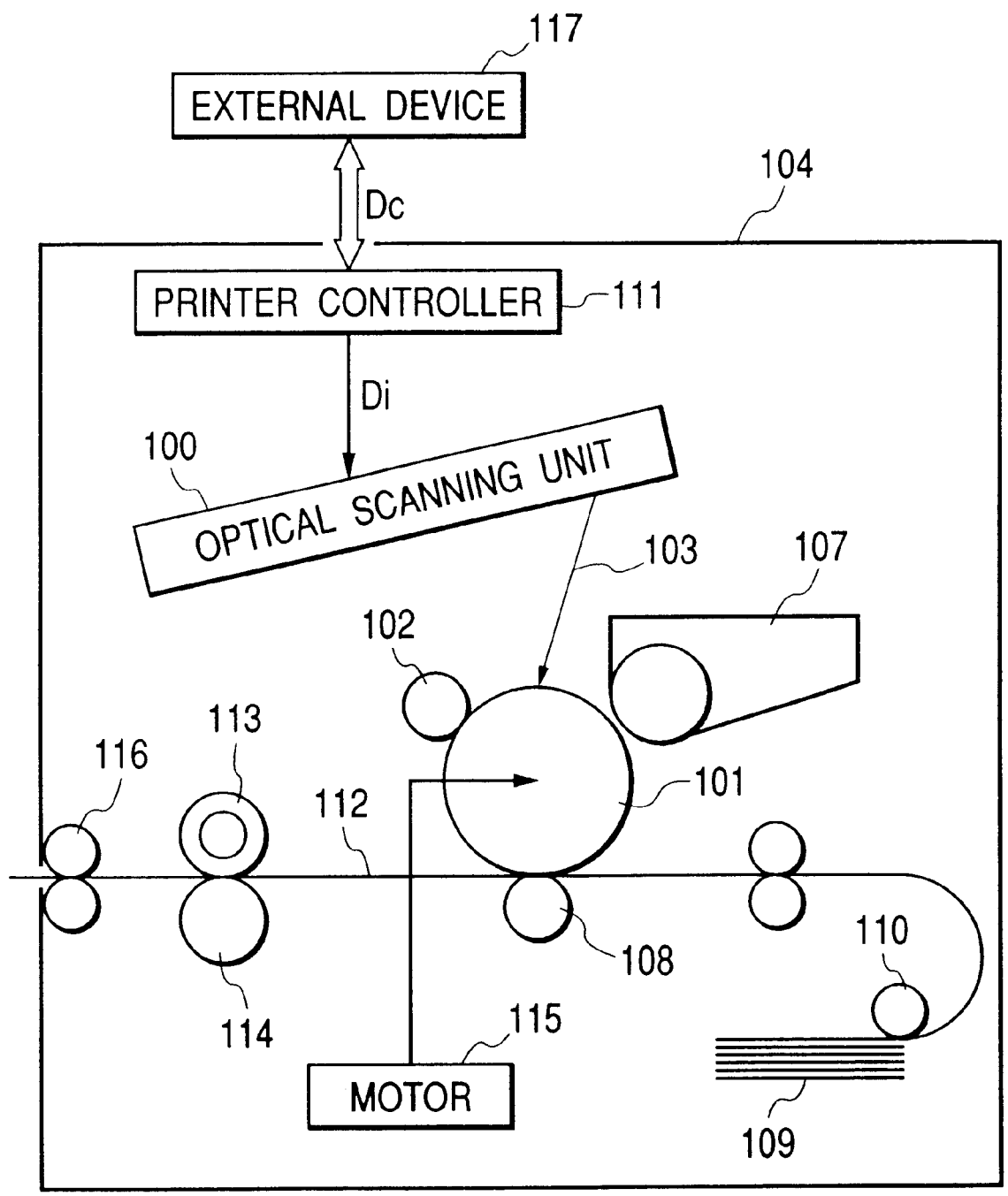
FIG. 6 is a cross-sectional view of principal part of an image-forming apparatus according to the present invention.

FIG. 6 is a cross-sectional view of the principal part along the sub-scanning direction to show an embodiment of the image-forming apparatus of the present invention. In FIG. 6, numeral 104 designates the image-forming apparatus. This image-forming apparatus 104 accepts input of code data Dc from an external device 117 such as a personal computer or the like. This code data Dc is converted into image data (dot data) Di by a printer controller 111 in the apparatus. This image data Di is supplied to an optical scanning unit 100 having the structure as described in either of Embodiments 1 to 5. This optical scanning unit 100 outputs an optical beam 103 modulated according to the image data Di and this light beam 103 scans a photosensitive surface of photosensitive drum 101 in the main scanning direction.

The photosensitive drum 101 as an electrostatic latent image carrier (photosensitive body) is rotated clockwise by a motor 115. With the rotation thereof, the photosensitive surface of the photosensitive drum 101 moves in the sub-scanning direction perpendicular to the main scanning direction, relative to the light beam 103. Above the photosensitive drum 101, a charging roller 102 for uniformly charging the surface of the photosensitive drum 101 is disposed so as to contact the surface. Then the surface of the photosensitive drum 101 charged by the charging roller 102 is exposed to the light beam 103 under scanning by the optical scanning unit 100.

As described previously, the light beam 103 is modulated based on the image data Di and an electrostatic latent image is formed on the surface of the photosensitive drum 101 under irradiation with this light beam 103. This electrostatic latent image is developed into a toner image by a developing unit 107 disposed so as to contact the photosensitive drum 101 downstream in the rotating direction of the photosensitive drum 101 from the irradiation position of the light beam 101.

The toner image developed by the developing unit 107 is transferred onto a sheet 112 being a transfer medium, by a transfer roller 108 opposed to the photosensitive drum 101 below the photosensitive drum 101. Sheets 112 are stored in a sheet cassette 109 in front of (i.e., on the right side in FIG. 6) of the photosensitive drum 101, but sheet feed can also be implemented by hand feeding. A sheet feed roller 110 is disposed at an end of the sheet cassette 109 and feeds each sheet 112 in the sheet cassette 109 into the conveyance path.

The sheet 112 onto which the toner image not yet fixed was transferred as described above, is further transferred to a fixing unit located behind the photosensitive drum 101 (i.e., on the left side in FIG. 6). The fixing unit is composed of a fixing roller 113 having a fixing heater (not illustrated) inside and a pressing roller 114 disposed in press contact with the fixing roller 113 and heats while pressing the sheet 112 thus conveyed from the transfer part, in the nip part between the fixing roller 113 and the pressing roller 114 to fix the unfixed toner image on the sheet 112. Sheet discharge rollers 116 are disposed further behind the fixing roller 113 to discharge the fixed sheet 112 to the outside of the image-forming apparatus.

Although not illustrated in FIG. 6, the print controller 111 also performs control of each section in the image-forming apparatus, including the motor 115, and control of the polygon motor etc. in the optical scanning unit described above, in addition to the conversion of data described above.

When the elements are set as described above according to the present invention, the optical scanning apparatus and the image-forming apparatus using it can be accomplished in the structure capable of always providing good images while controlling variation of the spot size of the beam to a small value on the surface to be scanned, by decreasing the focus movement amount even on the occasion of simultaneous occurrence of the change in the oscillation wavelength of the light from the light source means due to dispersion of the oscillation wavelength of the light from the light source means and/or due to the ambient temperature change and the refractive index change of the materials of the optical systems due to the ambient temperature change.

In addition, according to the present invention, as described above, a good balance can be made between the focus movement due to the ambient temperature change of apparatus and the focus movement due to the initial wavelength change of the light from the light source means, by providing the diffraction optical element in at least one optical system out of the first imaging optical system placed between the light source means and the deflecting means and the second imaging optical system placed between the deflecting means and the surface to be scanned, and properly setting the power of the diffraction optical element.

The need for adjustment of the cylindrical lens in the optical-axis direction is eliminated by the balance between the two focus movement amounts, thereby accomplishing the advantages in terms of cost, including the decrease of assembling time, decrease of assembling tools, and so on.

What is claimed is:

1. An optical scanning apparatus, comprising:
light source means for emitting light;
a first imaging optical system for converging emitted light from said light source means;
deflecting means for deflecting converged light from said first imaging optical system;
a second imaging optical system for scanning a surface to be scanned with deflected light from said deflecting means;
at least one refraction optical element in each of said first imaging optical system and said second imaging optical system; and
at least one diffraction optical element in said first imaging optical system or in said second imaging optical system,
wherein a power of said diffraction optical element is in a subscanning direction and is set to a third power between a first power and a second power,
wherein the first power is a power of said at least one diffraction optical element when a focus movement in the subscanning direction with respect to the surface to be scanned, caused by said at least one refraction optical element with a change of an initial oscillation wavelength of the emitted light, can be canceled by a power change of said at least one diffraction optical element, and wherein the second power is a power of said at least one diffraction optical element when a focus movement in the subscanning direction with respect to the surface to be scanned, caused by said at least one refraction optical element with a change of ambient temperature, can be canceled by a power change of said at least one diffraction optical element.

2. The optical scanning apparatus according to claim 1, wherein said at least one diffraction optical element is provided in said first imaging optical system.

3. The optical scanning apparatus according to claim 2, wherein said at least one diffraction optical element is provided on a surface in said first imaging optical system closest to said deflecting means.

4. The optical scanning apparatus according to claim 3, wherein said first imaging optical system comprises a lens having a power in the subscanning direction and said at least one diffraction optical element is provided on a surface of said lens having a power in the subscanning direction.

5. The optical scanning apparatus according to claim 4, wherein fcl≦500/αs, wherein αs is a longitudinal magnification of said second imaging optical system in the subscanning direction, and wherein fcl (mm) is a focal length of said lens having a power in the subscanning direction.

6. The optical scanning apparatus according to claim 5, wherein said lens having a power in the subscanning direction includes no position adjusting means for adjusting a position of an optical-axis direction.

7. The optical scanning apparatus according to claim 6, further comprising a third imaging optical system for converging the deflected light and guiding converged light from said third imaging optical system into said light deflecting means, wherein said third imaging optical system includes an imaging lens having a power at least in the main scanning direction, and said lens having a power in the subscanning direction and said imaging lens are integrally formed.

8. The optical scanning apparatus according to claim 5, wherein said lens having a power in the subscanning direction is formed from a plastic material.

9. The optical scanning apparatus according to claim 1, wherein:

$|dΔS\_T| \geq |dΔS\_\lambda|$ if $|dΔST\_\lambda| \geq |dΔS\lambda\_T|$, or $|dΔS\_T| \leq |dΔS\_\lambda|$ if $|dΔST\_\lambda| < |dΔS\lambda\_T|$; and wherein dΔSλ_T is a focus movement amount with an ambient temperature change when the power of said at least one diffraction optical element is the first power;

dΔST_λ is a focus movement amount with a change of an initial oscillation wavelength of said light source means when the power of said at least one diffraction optical element is the second power;

dΔS_T is a focus movement amount with the ambient temperature change; and dΔS_λ is a focus movement amount with the change of the initial oscillation wavelength of said light source means when the power of said at least one diffraction optical element is the third power.

10. The optical scanning apparatus according to claim 1, wherein said at least one refraction optical element and said at least one diffraction optical element are disposed so that a focus movement amount with a change of 1 nm in the initial oscillation wavelength is not more than 0.3 mm.

11. An optical scanning apparatus, comprising:

light source means for emitting light;

a first imaging optical system for converging emitted light from said light source means;

deflecting means for deflecting converged light from said first imaging optical system;

a second imaging optical system for scanning a surface to be scanned, with deflected light from said deflecting means; and at least one refraction optical element in each of said first imaging optical system and said second imaging optical system; and at least one diffraction optical element in said first imaging optical system or in said second imaging optical system, wherein a power of said diffraction optical element is a power in a subscanning direction and is set to a third power between a first power and a second power, wherein the first power is a power that said diffraction optical element has when a focus movement in the subscanning direction with respect to the surface to be scanned, caused by said at least one refraction optical element with a change of an initial oscillation wavelength of the emitted light, can be canceled by a power change of said diffraction optical element;

wherein the second power is a power that said diffraction optical element has when a focus movement in the subscanning direction with respect to the surface to be scanned, caused by said at least one refraction optical element with a change of ambient temperature, can be canceled by a power change of said diffraction optical element, and wherein said first imaging optical system includes a lens, which i) is formed from a plastic material, ii) has a power in the sub-scanning direction, and iii) satisfies the following relationship:

$fcl \leq 500/αs,$ wherein fcl is a focal length of said lens, and

αs is a longitudinal magnification in the sub-scanning direction of said second imaging optical system.

12. The optical scanning apparatus according to claim 11, wherein said at least one diffraction optical element is provided in said first imaging optical system.

13. The optical scanning apparatus according to claim 11, wherein:

$|dΔS\_T| \geq |dΔS\_\lambda|$ if $|dΔST\_\lambda| \geq |dΔS\lambda\_T|$, or $|dΔS\_T| \leq |dΔS\_\lambda|$ if $|dΔST\_\lambda| < |dΔS\lambda\_T|$; and dΔSλ_T is a focus movement amount with an ambient temperature change when the power of said at least one diffraction optical element is the first power;

dΔST_λ is a focus movement amount with a change of the initial oscillation wavelength of said light source means when the power of said at least one diffraction optical element is the second power;

dΔS_T is a focus movement amount with the ambient temperature change; and $d\Delta S\_\lambda$ is a focus movement amount with the change of the initial oscillation wavelength of the emitted light when the power of said at least one diffraction optical element is the third power.

14. The optical scanning apparatus according to claim 11, wherein said at least one refraction optical element and said at least one diffraction optical element are disposed so that a focus movement amount with a change of 1 nm in an initial oscillation wavelength is not more than 0.3 mm.

15. An image-forming apparatus comprising said optical scanning apparatus as in any one of claims 1, 2–7, 9–10 or 11, and further comprising:

a photosensitive body placed on the surface to be scanned;

a developing unit for developing an electrostatic latent image formed on said photosensitive body with deflected light into a developed toner image;

a transfer unit for transferring the developed toner image onto a transfer medium; and a fixing unit for fixing the transferred toner image onto the transfer medium.

16. The image-forming apparatus comprising said optical scanning apparatus as in any one of claims 1, 2–7, 9–10 or 11, and further comprising a printer controller for converting code data, supplied from an external device, into an image signal and supplying the image signal to said optical scanning apparatus.

17. The optical scanning apparatus according to any one of claims 4 through 6 or 11, wherein said lens comprises a cylindrical lens.

* * * * *

UNITED STATES PATENT AND TRADEMARK OFFICE
CERTIFICATE OF CORRECTION

PATENT NO.     : 6,563,624 B1                                              Page 1 of 1
DATED          : May 13, 2003
INVENTOR(S)    : Keiichiro Ishihara It is certified that error appears in the above-identified patent and that said Letters Patent is hereby corrected as shown below:

<u>Column 19,</u>
Line 10, "as," should read -- $\alpha$s, --.

<u>Column 25,</u>
Line 11, "1, 2-7, 9-10 or" should read -- 1 through 7 or 9 through 11, --.
Line 12, "11," should be deleted.

<u>Column 26,</u>
Line 6, "1, 2-7, 9-10 or" should read -- 1 through 7 or 9 through 11, --.
Line 7, "11," should be deleted.

Signed and Sealed this

Thirteenth Day of January, 2004

JON W. DUDAS
*Acting Director of the United States Patent and Trademark Office*